Patented Mar. 2, 1937

2,072,806

UNITED STATES PATENT OFFICE 2,072,806

PROCESS FOR THE SEPARATION OF PRIMARY FROM SECONDARY ALCOHOLS

Dennistoun Wood, Jr., Palo Alto, Calif., assignor to E. I. du Pont de Nemours & Company, Wilmington, Del., a corporation of Delaware No Drawing. Application January 6, 1933, Serial No. 650,508

4 Claims. (Cl. 260—156)

This invention relates to a process for the separation of primary from secondary alcohols contained in a mixture thereof and particularly to the separation of such alcohols contained in a mixture of oxygenated organic compounds obtained by the catalytic hydrogenation of carbon oxides under pressure.

The orthodox method for separating primary from secondary alcohols involves, generally, heating the mixture of alcohols in a benzene solution with phthalic anhydride. The primary alcohols react with phthalic anhydride to form the esters more readily than do the secondary alcohols and usually the half-ester is produced. The resulting benzene solution is then cooled to crystallize out the phthalic anhydride which has not reacted, and is subsequently treated with just enough alkali to change the monophthalate of the primary alcohol to an alkali monoalkyl phthalate. By means of this alkali treatment the alkali monoalkyl phthalate containing the primary alcohols separate in the lower layer from the benzene containing the unreacted secondary alcohols which collect in the upper layer. The layers are separated and washed,—the alkali layer with benzene and the benzene layer with water. A fair degree of separation of the alcohols may be obtained. The separated alkaline portion is then further treated with excess alkali to give the di-alkali phthalate, and the primary alcohols, which are released by this reaction, may then be removed by steam distillation. The secondary alcohols are separated by distillation from the benzene layer. By this treatment, of course, there remains as a by-product the di-alkali salt of phthalic acid which cannot again be used in the process until it has been reconverted to the anhydride.

An object of the present invention is to provide a process for the separation of primary from secondary alcohols having many outstanding advantages over the orthodox method described above. A further object of the invention is to provide such a process for the separation of the primary from the secondary alcohols found in the mixture of oxygenated organic compounds obtained by the catalytic hydrogenation of carbon oxides under pressure. A still further object of the invention is to provide a process for the separation of primary from secondary alcohols by the aid of an anhydride which forms an ester with the primary alcohols having a boiling point higher than the boiling point of the unreacted secondary alcohols present and which can be readily decomposed to give, by thermal treatment, the anhydride and the primary alcohol. Other objects and advantages will hereinafter appear.

I have found that primary alcohols can be separated from secondary alcohols by treating a mixture of them with phthalic anhydride in accord with the present invention without the many difficulties inherent in the above method of separation. Furthermore, I have found that in lieu of using phthalic anhydride a number of other anhydrides may be employed for effecting the separation providing these anhydrides from esters with the primary alcohols which have boiling points greater than the boiling points of the mixture of alcohols being treated and further providing they can be reconverted upon thermal decomposition into the anhydride.

Generally speaking, my process may be carried out in the following manner, for the separation of a mixture of alcohols containing both the primary and secondary alcohols. The mixture is heated with the anhydride until solution is complete and the resulting solution is then refluxed at a temperature somewhat below the boiling point, until all of the alcohols present, which will react with the anhydride, have reacted. The temperature is then raised, whereupon the unreacted alcohols will distill over leaving behind the half-ester formed between the primary alcohols and the anhydride. In order not to decompose the half-ester the temperature of this preliminary distillation should be as low as possible, and it is, therefore, of advantage to conduct it under a fairly high vacuum,—say, from 1 to 50 mm. of mercury. The remaining half-ester is further heated usually under pressure, whereupon it will be decomposed, the primary alcohols distilling over leaving behind as a residue the anhydride.

When effecting the separation of primary from secondary alcohols present in a mixture of oxygenated organic compounds obtained by the catalytic hydrogenation of carbon oxides under pressure, (these compounds may be made according to any of the known processes therefor, e. g. those described in U. S. Patents Nos. 1,820,417 and 1,844,857), or other mixtures containing primary and secondary alcohols, there may be present in these mixtures a number of unknown organic substances which are separated with the primary or secondary alcohols portions. Hereinafter, therefore, when referring to the substances separated by my process from such mixtures, in order to include all of those contained in the portion removed by esterification from the portion left unesterified, the portions will be designated as the esterified and unesterified portions respectively, the former including the primary and reactive alcohols, the latter the secondary and non-reactive alcohols.

When separating the primary from the secondary alcohols, or ester-forming from non-esterforming compounds present in a mixture of oxygenated organic compounds obtained by the catalytic hydrogenation of carbon oxides under pressure, I prefer generally to use phthalic anhydride, although for the separation of the alcohols present in this mixture, as well as for the separation of similar alcohols from any other mixture containing them, the anhydrides of the following acids may be employed: adipic, succinic, sebacic, tartaric, trimesic, hexahydrophthalic, tetrahydrophthalic, and in many instances the anhydride of the monobasic acids may be used, such, for example, as propionic, butyric, isobutyric, etc.

I will now give an example to illustrate more specifically one method by which my process may be carried out, but it will be understood that I shall not be restricted by the details therein given except as they may be limited in the appended claims.

Example.—96,300 cubic centimeters of the oxygenated organic compounds, obtained by the catalytic hydrogenation of carbon oxides under pressure, boiling between approximately 133–147° C., and which contain approximately 54% primary and 40% secondary alcohols including such alcohols as 2,4-dimethyl pentanol-3, 3-methyl pentanol-2, 2-methyl pentanol-1, etc., the remaining 6% comprising ketones and other compounds, were mixed with 190 lbs. of flaked phthalic anhydride. The mixture was heated to effect solution of the anhydride in the mixture of compounds and then refluxed at a temperature of approximately 100° C. and one atmosphere of pressure in order to convert the primary alcohols present into the half-ester of phthalic acid. After approximately 12 hours, the esterification was considered to be complete and the temperature of the mixture was then raised and the pressure lowered to approximately 5 cm. of mercury and between the temperatures of 110–140° C. 75,200 c. c. distilled over, constituting approximately all of the unesterified compounds present in the mixture of compounds and containing substantially all of the secondary alcohols. The temperature of the mixture was further raised and between 140–160° C., which may be designated as the transition stage, the last of the unesterified compounds distilled over along with some of the products resulting from the decomposition of the phthalic ester. The pressure was then raised to approximately one atmosphere and from 160° C. up 25,000 c. c. of the phthalate decomposed releasing primary alcohols and esterified compounds which distilled over, leaving as a residue phthalic anhydride. The primary and secondary alcohols obtained in accord with this process can then be separated by fractional distillation or by other suitable methods into the individual alcohols.

The advantages derived from utilizing my process are apparent when it is realized that all of the laborious extraction and washing operations present in the former orthodox method have been eliminated, and, furthermore, the anhydride obtained upon the thermal decomposition of the half-ester is ready for use, without further treatment, to effect a separation of the alcohols from a fresh mixture thereof.

In order to increase the rapidity of the esterification stage suitable catalysts may be present, such, for example, as sodium or lead oxide, although their presence is by no means essential to the operation of the process.

The temperature used for effecting the esterification as well as that used to distill over the unesterified compounds and finally that employed for decomposing the anhydride will, of course be determined by the mixture of compounds being separated as well as the anhydride being utilized to effect the separation. Ordinarily it has been found advantageous to use a fairly high vacuum when effecting by distillation the separation of the unesterified from the esterified compounds, and when decomposing the half-ester of the anhydride, pressure is often of advantage to facilitate rapid and thorough decomposition.

From a consideration of the above specification it will be realized that any process for the separation of primary from secondary alcohols or the esterifiable from the non-esterifiable portions of a mixture of oxygenated organic compounds will come within the scope of this invention, if such a separation is effected by the process hereinbefore described.

I claim:

1. In a process for the separation of easily esterifiable portions from the more difficultly esterifiable portions of a mixture of oxygenated organic compounds obtained by the catalytic hydrogenation of carbon oxides under elevated temperature and pressure the steps which comprise esterifying the easily esterifiable portion of the mixture of compounds with an organic dibasic acid anhydride which forms therewith an ester, the boiling point of which is higher than the boiling point of the unesterified portion of the mixture of compounds, separating by distillation the resulting ester from the unesterified portion and by thermal decomposition splitting up the ester, thereby reforming the anhydride and the esterified portion.

2. In a process for the separation of easily esterifiable portion from the more difficultly esterifiable portion of a mixture of oxygenated organic compounds obtained by the catalytic hydrogenation of carbon oxides under elevated temperature and pressure, the steps which comprise esterifying the easily esterifiable portion of the mixture of compounds with phthalic anhydride, separating by distillation the resulting phthalate from the more difficultly esterifiable portion and by thermal decomposition reforming the esterified portion from the reconverted phthalic anhydride.

3. In a process for the separation of the primary alcohols from the secondary alcohols present in a mixture of oxygenated organic compounds obtained by the catalytic hydrogenation of carbon oxides under elevated temperature and pressure, the steps which comprise esterifying the primary alcohols of the mixture of compounds with an organic dibasic acid anhydride which forms therewith an ester, the boiling point of which is higher than the boiling point of the secondary alcohols present in the mixture of compounds, separating by distillation the resulting ester from the secondary alcohols and by thermal decomposition splitting up the ester, thereby reforming the dibasic acid anhydride and the primary alcohols.

4. In a process for the separation of the primary alcohol portion from the secondary alcohol portion of a mixture of oxygenated organic compounds boiling between 133 and 147° C., and obtained by the catalytic hydrogenation of carbon oxides under elevated temperature and pressure, the steps which comprise reacting 96.3 liters of the oxygenated organic compound with approximately 190 pounds of flake phthalic anhydride, heating the resulting mixture to 100° C., and refluxing for approximately 12 hours, distilling the resulting product under a vacuum of approximately 5 centimeters of mercury and at a temperature of from 110 to 140° C., to remove the secondary alcohols and the unesterified products, raising the pressure to approximately 1 atmosphere and the temperature to from approximately 160° C., up and distilling off the primary alcohols by decomposition of the phthalates.

DENNISTOUN WOOD, Jr.